United States Patent
Morabit et al.

(10) Patent No.: US 6,415,585 B2
(45) Date of Patent: Jul. 9, 2002

(54) MULTI-PURPOSE TRIMMER, EDGER AND SWEEPER WITH OR WITHOUT SUPPORT CART, AND WITH ENHANCED INERTIA HEAD

(76) Inventors: Vincent D. Morabit, 1230 Wendy Rd., Rock Hill, SC (US) 29732; Christopher J. Morabito, 654 E. Main St., Rock Hill, SC (US) 29730

(*) Notice: Subject to any disclaimer, the term of this patent is extended or adjusted under 35 U.S.C. 154(b) by 0 days.

(21) Appl. No.: 09/370,897

(22) Filed: Aug. 10, 1999

Related U.S. Application Data

(60) Provisional application No. 60/103,549, filed on Oct. 8, 1998, and provisional application No. 60/126,268, filed on Mar. 25, 1999.

(51) Int. Cl.[7] .............................................. A01D 34/00
(52) U.S. Cl. ........................................ 56/12.7; 30/276
(58) Field of Search ................................ 56/12.1, 12.7, 56/16.7, 12.8, 13.4, 7, 13.3; 30/276, 124; 15/330, 344, 405

(56) References Cited

U.S. PATENT DOCUMENTS

| | | | | |
|---|---|---|---|---|
| 4,269,372 A | * | 5/1981 | Kwater | 242/129.8 |
| 4,356,686 A | * | 11/1982 | Lessig, III | 56/295 |
| 4,493,151 A | * | 1/1985 | Mitchell | 30/276 |
| 4,825,627 A | * | 5/1989 | Truderung | 56/12.7 |
| 4,827,702 A | * | 5/1989 | Cerreta | 56/12.7 |
| 4,835,950 A | * | 6/1989 | Cerreta | 56/12.8 |
| 5,276,968 A | * | 1/1994 | Collins et al. | 30/276 |
| RE34,815 E | * | 1/1995 | Byrne | 172/15 |
| 5,810,093 A | * | 10/1996 | Howard | 172/111 |
| 5,613,354 A | * | 3/1997 | Foster | 56/16.7 |
| 5,722,172 A | * | 3/1998 | Walden | 30/347 |
| 5,890,352 A | * | 5/1998 | Molina | 56/12.7 |
| 5,761,816 A | | 6/1998 | Morabit et al. | |
| 5,845,405 A | * | 12/1998 | Rosdahl | 30/276 |
| 5,862,595 A | * | 1/1999 | Keane | 30/124 |
| 5,862,598 A | | 1/1999 | Lee | |
| 5,862,655 A | | 1/1999 | Altamirano | |
| 5,884,462 A | * | 3/1999 | Gerber | 56/12.1 |
| 5,894,630 A | * | 4/1999 | Bitner et al. | 15/330 |
| 6,050,069 A | * | 4/2000 | Elensky | 56/7 |
| 6,094,823 A | * | 8/2000 | Brown et al. | 30/276 |
| 6,116,350 A | * | 9/2000 | Notaras et al. | 172/15 |

OTHER PUBLICATIONS

Printout of "Weed Walker.com" Internet site, Dated 1999.

* cited by examiner

Primary Examiner—Thomas B. Will
Assistant Examiner—Árpád Fábián Kovács
(74) Attorney, Agent, or Firm—Nixon & Vanderhye P.C.

(57) ABSTRACT

A string trimmer having a head with aerodynamic cutting line with a long beam axis and a pitch angle may be used for both vegetation cutting and as a blower. A gear box may be provided for changing the gear ratio from the engine or motor to the head depending upon the pitch angle. Optimum cutting operation is provided with a pitch angle of about 0–10°, and when used as a blower the optimum pitch angle is between about 15–45° upward. The string trimmer may be mounted on a cart having a bottom frame with at least three wheels, first and second adjustable length arms each rotatably mounted by the substantially vertical axis and having a free end, and a clamp at the first arm free end for clamping the shaft of the string trimmer, and a clamp or flexible band or cord at the end of the second arm, typically also for engaging the string trimmer shaft to provide substantially 360° freedom of movement thereof. In order to maximize cutting efficiency the trimmer head may have a polar moment of inertia of about 1.6–2.4 inch pounds second squared, which may be provided by the inherent construction of the head, or by lead tape placed at various locations on the head.

19 Claims, 12 Drawing Sheets

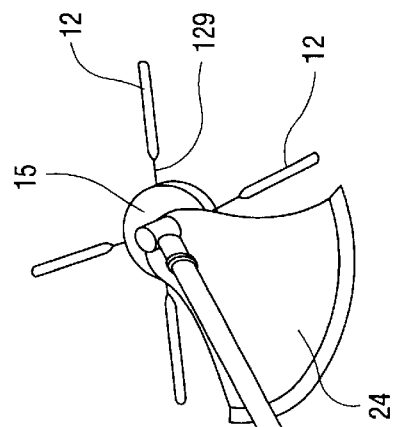
Fig. 2
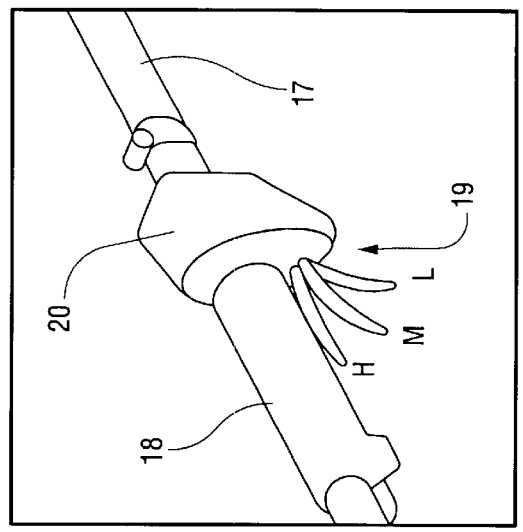
Fig. 3
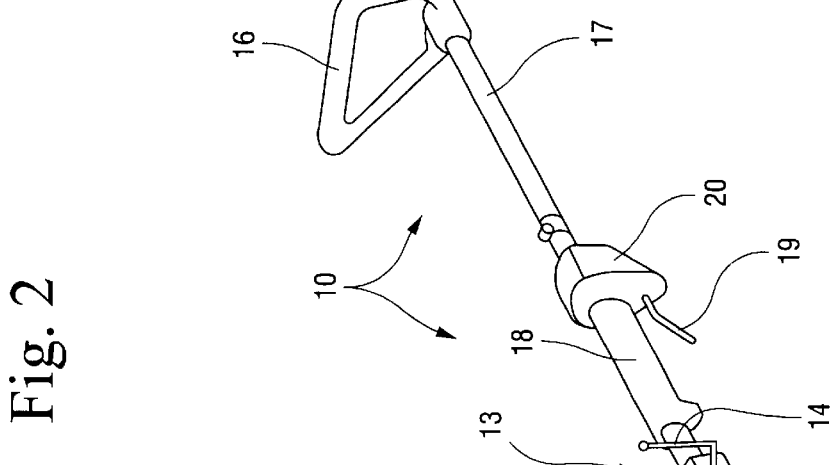
Fig. 1
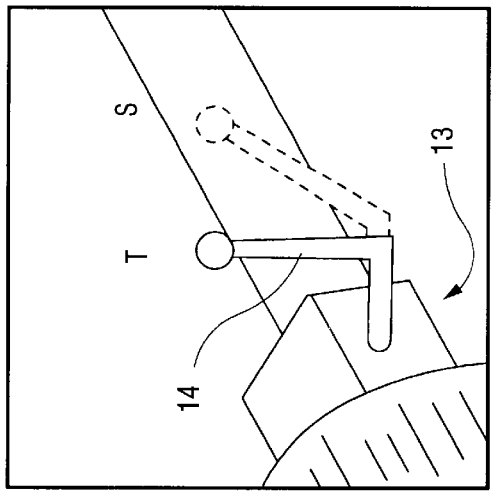
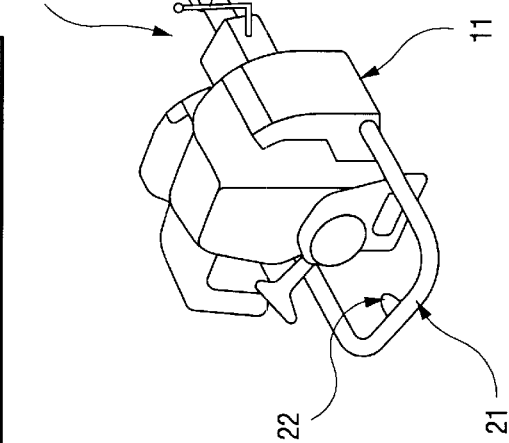

MULTI-PURPOSE TRIMMER, EDGER AND SWEEPER WITH OR WITHOUT SUPPORT CART, AND WITH ENHANCED INERTIA HEAD

CROSS REFERENCE TO RELATED APPLICATION

This application is based upon provisional applications No.60/103,549 filed Oct. 8, 1998 and No. 60/126,268 filed Mar. 25, 1999, the disclosures of which are incorporated by reference herein.

BACKGROUND AND SUMMARY OF THE INVENTION

The invention relates to a multi-purpose professional trimmer, edger, and sweeper that may be used with or without a support cart and with or without an enhanced inertia head. With the support cart it can have many of the advantages of a conventional lawnmower, while still retaining the advantages of string trimmers. In the power devices according to the invention, the basic configuration of the string (line) that is used according to the invention is as disclosed in U.S. Pat. No. 5,761,816, U.S. application Ser. No. 09/243,786, filed Feb. 3, 1999, and U.S. provisional application Ser. No. 60/103,549, filed Oct. 8, 1998, the disclosures of all of which are hereby incorporated by reference herein.

By practicing the invention it is possible to have optimum operation of a string trimmer for cutting vegetation, and also allow the string trimmer to be used as a blower or sweeper, and when in the blower or sweep mode still allowing it to be used as an edger. When the string trimmer is mounted on a cart it can be precisely positioned to take the place of a lawn mower, to do precise edging or trimming, or to accomplish a number of other objectives. When used as a blower in addition to moving vegetation from areas where it is not wanted (such as on sidewalks, patios, driveways, or the like) it can provide a cooling flow of air for the operator.

According to one aspect of the present invention a string trimmer is provided comprising: An engine or motor. A head operative connected to the engine or motor. An aerodynamic line connected to the head and having a long beam axis having a pitch angle. A shaft extending between the engine or motor and the head. And a gear box with at least two different gearings operatively connected between the engine or motor and the head for changing the gear ratio depending upon the pitch angle.

According to this aspect of the invention the engine or motor and gear box are preferably constructed so that for a first gear box gearing the head has a rotational speed of between 2500–6000 rpm, and for a second gearing the head has a rotational speed of over 6000 rpm. The string trimmer may further comprise an air scroll and debris shield, which functions as a debris shield when the aerodynamic line is used to cut vegetation, and which functions as an air scroll when the trimmer is used as a blower.

The string trimmer may also comprise at least one detented trigger which controls the energy supply to the engine or the motor. By controlling the energy supply to the engine or motor it is meant that the flow of fuel or electrical current to the engine or motor is controlled. For example, the string trimmer may further comprise a handle mounted on the shaft, a first detented trigger having at least three operational positions mounted on the shaft for controlling the energy supply to the engine or motor, a second handle mounted on the engine or motor on the opposite portion thereof from the head, and a second detented trigger mounted on the second handle for alternatively controlling the energy supply to the engine or rotor. The string trimmer may be mounted on a cart, as described hereafter.

The string trimmer may also further comprise means for changing the pitch angle of the aerodynamic line from a first pitch angle which is between about 0–10°, and a second pitch angle which is between about 15–45° upward. The means for adjusting the pitch angle may comprise distinct first and second cartridges mounted to said heads, the first cartridge mounting the aerodynamic line so that it has a predetermined pitch angle between about 0–10°, and the second cartridge positively mounting the aerodynamic line so that it has a pitch angle between about 15–45° upward, the first and second cartridges being alternatively mounted to the head and shaft. The invention may comprise a first head having a polar moment of inertia of between about 1.6–2.4 inch pounds second squared. When the engine or motor comprises a gasoline engine, the gear box has a first gear ratio so that the ratio of the engine speed to the head speed is about 1.5 or less. When the engine or motor comprises a battery powered motor, the gear box has a first gear ratio so that the ratio of engine output speed to head speed is greater than 1.4.

According to another aspect of the present invention a string trimmer is provided comprising: An engine or motor. A head operative connected to the engine or motor. An aerodynamic line connected to the head and having a long beam axis having a pitch angle. A shaft extending between the engine or motor and the head and the aerodynamic line is mounted by the head so that the aerodynamic line has a pitch angle of about 5–45° upward so that the string trimmer acts as a blower while still being capable of edging or trimming. The engine or motor is preferably constructed and operatively connected to the head so that the head has a speed of rotation of over 6000 rpm. A handle may be mounted on the shaft, having a first detented trigger having at least three operational positions mounted on the shaft for controlling by feel, the energy supply to the engine or motor, a second handle may be mounted on the engine or motor on the opposite portion thereof from the head, and a second detented trigger may be mounted on the second handle for alternatively controlling the energy supply to the engine or rotor. The system optionally may include a cart having at least three wheels and first and second adjustable arms mounting the shaft or engine or motor thereto so that the string trimmer is operational by utilizing the second trigger when mounted to the cart. The system may also further comprise an air scroll and debris shield for the head, which functions as a debris shield when the aerodynamic line is used to cut vegetation, and which functions as a directional air scroll when the trimmer is used as a blower.

According to another aspect of the present invention there is provided a method of operating a string trimmer having an engine or motor which is operative connected to a head, the head mounting aerodynamic line having a long beam axis having a pitch angle, the method comprising: (a) Operating the engine and the head in a first mode of operation where the pitch angle of the aerodynamic line is between about 0–10° and the string trimmer is used for vegetation cutting. (b) Operating the string trimmer in a second mode where the pitch angle is between about 15–45° upward and the string trimmer is used as a blower to provide a downward flow of air which clears cut vegetation in the surrounding area, and may provide a downward cooling flow of air. And, (c) operating the string trimmer in a third mode where the pitch angle is between 5–30° downward to create an updraft for lawn mowing. For example, in the practice of the method (a) is practiced to rotate the head with an rpm of between 2500–6000 rpm, and (b) is practiced to rotate the head at an rpm of over 6000 rpm while (c) is practiced to rotate the head at an rpm between 3000–5000 rpm.

According to another aspect of the invention there is provided a bottom frame assembly mounting at least three wheels, each wheel rotatable about a substantially horizontal axis. First and second adjustable length arms, each arm mounted for rotation about a substantially vertical axis, and each arm having a free end. A clamp at the free end of the first arm for clamping a shaft of a string trimmer thereto. And a clamp, a flexible band, or flexible cord mounted at the free end of the second arm for operative attachment to the string trimmer so as to mount the string trimmer, with the clamp at the first arm free end, so as to facilitate utilization thereof for vegetation cutting and one or more other functions.

The cart as described above may further be constructed wherein at least three wheels comprising first and second back wheels, each mounted for rotation about a separate axle; and at least one front steerable wheel; and further comprising a support frame for supporting the arms to the bottom frame. The bottom frame and the support frame may consist essentially of hollow plastic tubes.

The cart may be provided in combination with a string trimmer, the string comprising: An engine or motor. A head operative connected to the engine or motor. An aerodynamic line connected to the head and having a long beam axis having a pitch angle. A shaft extending between the engine or motor and the head. And at least one handle, the at least one handle mounted on a portion of the string trimmer on an opposite side of the engine or motor from the head, and the at least one handle having a detented trigger for controlling the supply of energy to the engine or motor; and wherein at the end of the second arm a flexible band or cord is provided which wraps around the string trimmer shaft and allows essentially 360° freedom of movement of the shaft with respect to the cart while still attaching the cart to the shaft. The handle may be used by an operator to control the string trimmer.

According to yet another aspect of the present invention a trimmer head for a string trimmer is provided comprising the following components: A body of relatively rigid material (e.g. of a metal, such as aluminum or zinc, or a rigid plastic). An aerodynamic line connected to the body and having a long beam axis and a twist with a living hinge and the head having a polar moment of inertia when used as a string trimmer head of between about 1.6–2.4 inch pounds second squared. For example the polar moment of inertia of the head may be approximately determined as follows:

$$I_{head}=(2M\theta)/(\omega_2{}^2-\omega_1{}^2)-I_{eng},$$

wherein $I_{eng}$=Total Inertia of Engine (Flywheel, Crank Shaft, Bearings, etc.), $I_{head}$=Total inertia of String Head, ω=angular velocity of head and engine, M=Torque or Moment created by cutting Grass, and θ=Total in cutting swath (in radians) where grass is being cut (maximum of 90 degrees or π/2).

The trimmer head may be operatively connected to a gasoline powered engine through gearing, the gearing providing a ratio of engine speed to the output speed of the head of about 1.5 or less; or may be operatively connected to a battery powered motor, and gearing, and wherein the gearing connects the battery powered motor to the head so that the ratio of motor speed to speed or rotation of the head is greater than 1.0. Lead or other dense weights may be mounted to or molded within the body spaced from the axis of rotation of the head, so that the head has a total weight of between about 8.4–24 ounces; or alternatively the head may be constructed initially so as to provide the desired moment of inertia, e. g. by adding metal or substantially rigid plastic thereto during construction, or by forming internal cavities which are then injected with molten lead or like heavier material than the material forming the head, and which form is solid when cooled.

It is the primary object of the present invention to provide enhanced functionality of a string trimmer, and optionally a cart which may further enhance the functionality thereof. This and other objects of the invention will become clear from an inspection of the detailed description of the invention and from the appended claims.

BRIEF DESCRIPTION OF THE DRAWINGS

FIG. 1 is a schematic perspective view of one exemplary embodiment of a string trimmer according to the present invention;

FIG. 2 is a detail perspective view of the gear box of the string trimmer of FIG. 1 showing the "T" or "trimmer" position in solid line, and the "S" or "sweeper" position in dotted line;

FIG. 3 is an enlarged detail view of the first detented trigger control of the string trimmer of FIG. 1;

DETAILED DESCRIPTION OF THE DRAWINGS

Figure 4:
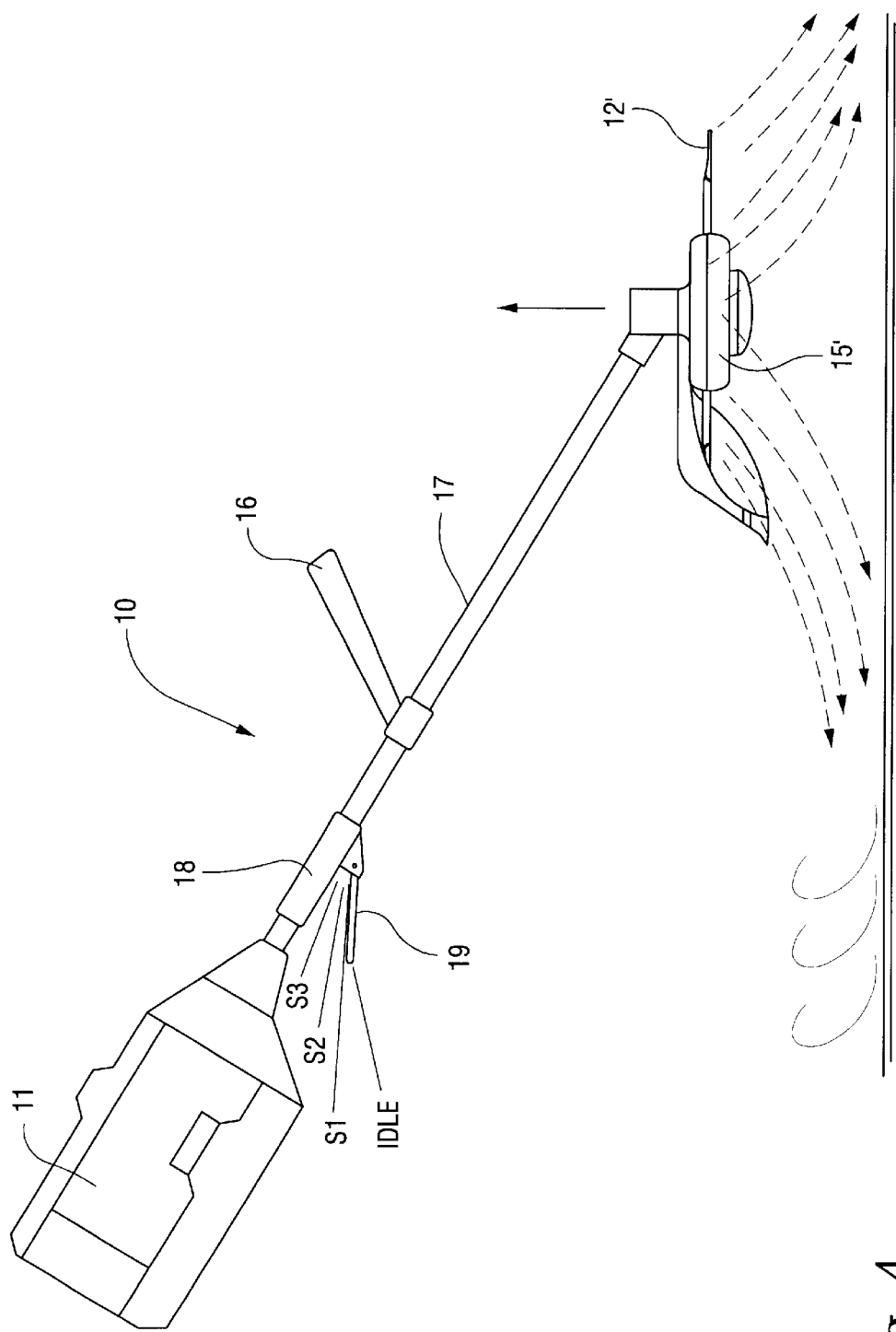
FIG. 4 is a side schematic view showing a modified form of a string trimmer according to the present invention when used as a blower/sweeper.

FIG. 1 is perspective schematic view of an exemplary multi-purpose professional string trimmer, edger, sweeper according to the invention, while FIGS. 2 and 3 are detailed views of component parts thereof. The string trimmer, shown generally by reference numeral 10, includes a conventional engine or motor 11 which is shown as gasoline powered, but could also be electric, and it is matched to the cutting head inertia and the line 12 configuration, the lines 12 preferably having the configuration shown in copending application Ser. No. 09/243,786, filed Feb. 3, 1999, including a twist forming a living hinge 12a; that is the lines 12 are "aerodynamic cutting lines". A gear box, shown schematically at 13 in FIGS. 1 and 2, having a multi-positional handle 14 shifts the speeds to control the speed of operation of the head 15 to which the strings 12 are attached and thereby control the speed of operation of the head 15. The head 15 is thus operatively connected to the engine or motor 11 and is driven thereby. For example, the speed of rotation of the head 15 for one purpose may be at one level, and for another purpose at another level. For example, for conventional trimming one shift setting in a gear box 13 may be provided which powers the head 15 at a speed of between 2500–6000 rpm at full speed, while when used as a blower, or when mounted on a support cart, it may be rotated at a speed of over 6000 rpm at full speed (e.g. 6000–9000 rpm). Particular examples are for normal trimming action a speed of about 4000 rpm assuming that the swath width during cutting is between about 15–17 inches, and when operating as a sweeper a speed of about 7000 rpm. Further, edging and mowing operations may be at a speed of about 3500 rpm or 7000 rpm.

Any suitable conventional gears may be provided in the gear box 13. Instead of being merely two speed, the gear box 13 may be three speed or possibly even four speed or may include reverse in another form. FIG. 2 illustrates in dotted line the trim speed position of the handle 14, while the sweep speed is indicated in dotted line. A neutral position of the gear box 13 is not necessary. The same speed choices can be accomplished by using belts or other mechanical elements instead of gears.

During normal use of the device 10 without a support cart or platform, it is typically grasped by a forward control handle 16 attached to the outer shaft 17 (with the inner shaft for rotating the head 15 within the outer shaft 17) and by the operation handle 18. For example, the operator would normally grasp the handle 16 with the left hand, and the grip 18 with the right hand. Associated with the grip 18 is a trigger 19 which is movable between several positions. FIG. 3 shows the trigger 19 (all in solid line just for convenience of illustration) in a low (L), medium (M), and high (H) position. Conventional detents, such as spring pressed balls and cooperating recesses, are provided associated with the trigger 19 and a mechanism within the housing 20 to detent the trigger 19 at each of the L, M and H positions. These positions conveniently control the supply of energy (e.g. the amount of gas or electricity) fed to the powerhead 11 and thereby control the power thereof, again for different circumstances for which the device 10 is used. The detent positions provide the operator a convenient and familiar power reference position (by feel) to easily and conveniently locate the trigger so as to adjust to a desired power level in cooperation with or independent of the gear shift setting. The trigger (spring loaded to close when released) can also operate at variable levels between detents if desired.

When the device 10 is to be used with a support cart (as hereinafter described) it is preferred that the handle 21—which extends from the opposite side of the engine 11 from the shaft 17, substantially coplanar with the shaft 17 and substantially perpendicular to the handle 16—is provided. The handle 21 includes its own detented trigger, either of the triggers 19, 22 being operable to control the powerhead 11. If desired, a master cutoff switch can be provided to cut off one of the triggers 19, 22 if desired.

Figure 5:
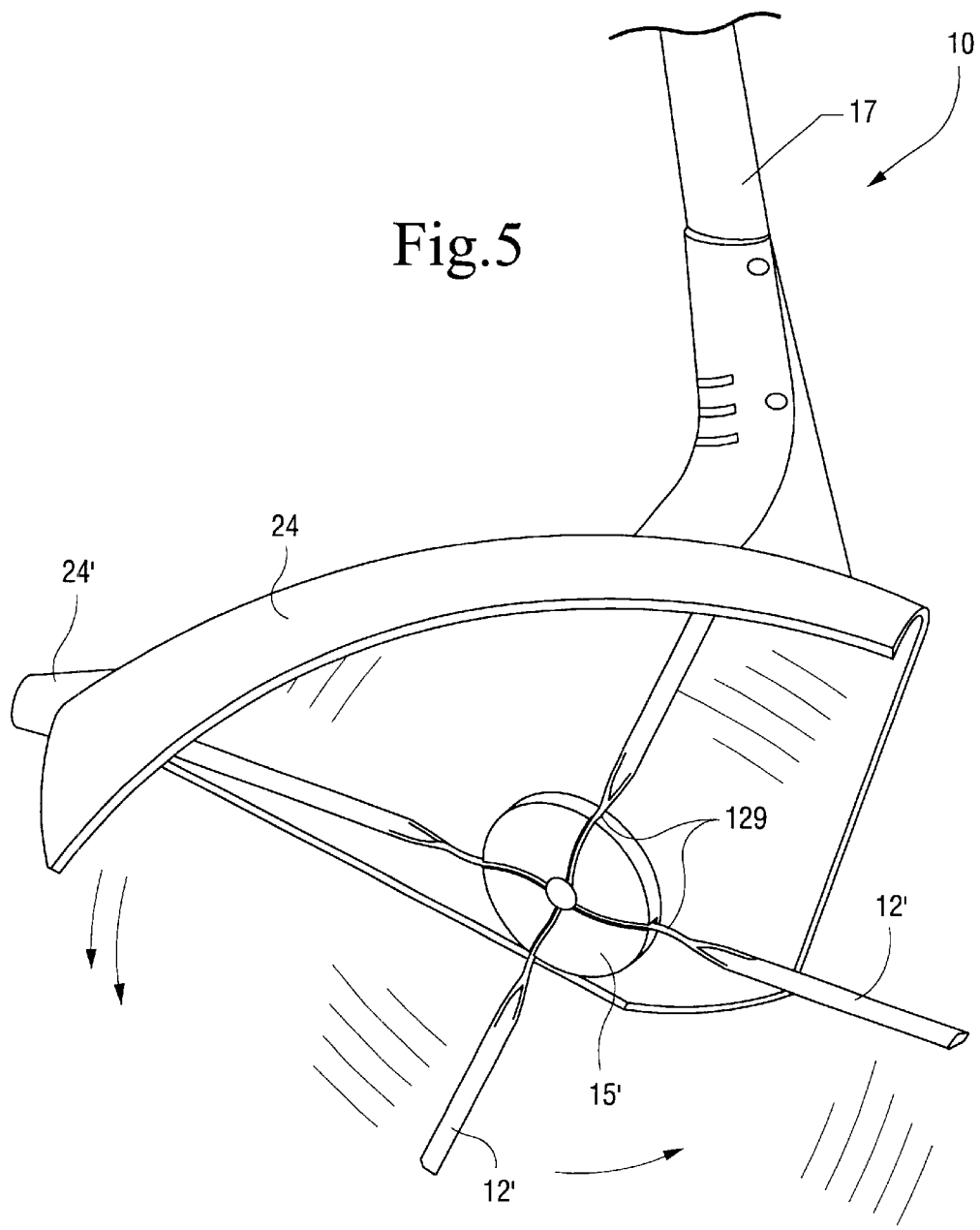
FIG. 5 is a bottom schematic perspective view of the head region of the string trimmer of FIG. 4 when used as a blower/sweeper.

Particularly when used as a sweeper, but also for other purposes, the balanced multiple line head 15 preferably includes a debris shield 24, which also acts as an air fan scroll to gather and direct air flow and for more precise sweeping functionality. Debris shield 24 preferably includes an edging guide 24'. In the practice of the invention for sweeping, the flexible cutting system uses aerodynamic line as disclosed in the above mentioned patent and applications, and a simple pitch control mechanism. In its simplest form the pitch control adjustment may be provided merely by replacing a cartridge containing a flexible line 12 with cartridges having different pitch. For example, a cartridge 15' illustrated in FIGS. 4 and 5 is utilized with the device 10 when it is to function as a blower or sweeper so that the line 12' has the pitch illustrated in FIG. 6 rather than the conventional pitch in which the long axis of the line 12 is substantially coextensive with the flight path. That is, for the cartridge 15', the aerodynamic line 12' would be twisted (see FIG. 5) at an angle such that it forces air downwardly.

By forcing the air down not only is a sweeping or blowing action accomplished, but a cool air current would flow back toward the operator. Even though primarily used for blowing in this configuration, because the elements 12' are still capable of cutting (although not as effectively as when they have the conventional in-line pitch), the cutters 12' can still be used especially for edging, such as cutting grass adjacent to sidewalks, driveways, etc., or cutting vegetation where it is not necessary that the cut be particularly even, such as in cracks and sidewalks, driveways, walkways, etc.

Figure 7:
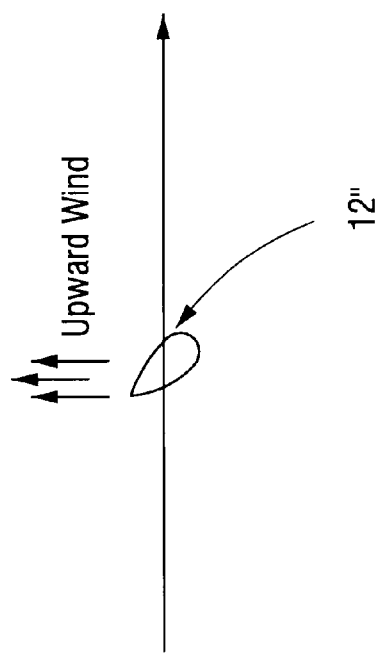
FIG. 7 is a view like that of FIG. 6 for an upward pitch of the aerodynamic line.

According to the present invention a pitch $\alpha$ (see FIGS. 6 and 7) of about 0–5° (upward 12" or downward) is optimum for performance and abrasion resistance. For the fan blade, an upward tilt (upward pitch) of up to about 45° for $\alpha$ (as actually illustrated in FIG. 6) is optimum, e.g., about 15–45° upward. When minimizing thrown objects is an important consideration, but performance and abrasion resistance are still important, then a balanced optimum pitch is upward about 3–10°.

In the blower embodiment of the invention, the radial lines 12, 12', and 12" that emanate from the line trimmer head are set to an optimal angle to move air by a displacement process from each flexible line 12, 12', 12" similar to a ceiling fan or a window fan or an airplane propeller, or in the extreme a boat propeller, which does not compress the liquid but displaces it. Conventional landscape blowers, for example, hand-held, backpack, or ground supported, operate with centrifugal fans that bring air into the center of the impeller and add energy or power to the air by creating a centrifugal force which accelerates the air mass radially through the impeller vanes at high exiting velocity. This process creates noise during its compression as well as during its expansion process where the air exits the nozzle. The compressible air mass gathers and collects within a "scroll", which directs its total flow around bends and curves while at elevated pressures to an output nozzle. Air exits the nozzle or discharge chute at very high velocities while it expands from its pressurized condition into the atmosphere. This expansion process creates added noise at generally relatively high frequencies.

The exiting narrow stream of high velocity from the conventional landscape blower is then directed by the operator from an elevated position downward onto the ground to blow away the debris from the surface. The air volume jet hits the ground at an angle, not generally in the needed direction required to blow the debris as it inefficiently deflects somewhat upward while only a component portion of the original jet becomes useful and effective. Further, as the air expands and deflects, undesirable dust is created in this process.

In contrast, the blower of the invention is more efficient and better suited for this process. Since there is such minimal compression of the air, there is very low noise. Additionally, it is very efficient because it releases air very close to the ground both axially and radially with a fan-like spread in the direction needed to blow debris away. Accordingly, there is greater efficiency with less noise and less dust.

The inventive process of displacing and moving air directly at the source is in an overall sense, more efficient and quieter than the conventional centrifugal fan process. It naturally releases air with less operator effort because the operator simply turns the trimmer head with its line fan in the desired plane to seep. There is supportive upward fan thrust which reduces the weight of the unit 10 as its upward force vector from the fan works to aid the operator with less effort compared to the conventional landscape blower due to thrust forces at the discharge chute. In conventional blowers the operator must push against the nozzle to stabilize the output nozzle against these discharge force vectors so as to direct the velocity jet to a desired direction, thus creating adding and unnecessary work; additionally, the operator must unnaturally support the entire hand-held or backpack weight as well as fighting the discharge velocity thrusts. These efforts required of the conventional blower, in comparison to the inventive process are greatly reduced, thus offering greater operator comfort.

A method of trimmer/blower operation is available by means of compromise of optimum fan line angle and optimum trimmer line angles. For example, converting line pitch to a 20° angle instead of the optimum 45° fan line angle and an optimum trimmer line angle of about 5°, thus establishing a universal 20° setting offers a practical and effective method while choosing specific speed levels. For example, trim at low speeds with low downward air flow and operate at high speeds for the higher flow line fan. Therefore, one set of lines at 20° does both jobs.

Therefore, the line fan blower 10 of FIGS. 4–7 is more ergonomically suited to the landscape blower process because of its quieter, more efficient process and its better utilization of blower thrusts to reduce work required by the operator.

Additionally, blower 10 of the invention quickly and easily converts a flexible line trimmer from a grass trimmer to a simple flexible line fan blower without tools or complex changes by only a change in the line 12, 12'. This compares to the current method of trimmer conversion by removing the presently fitted trimmer attachment shaft or head to convert to the centrifugal blower system, which is bulky, complex and expensive.

After trimming and prior to the final blower process, the operator would have to either inconveniently locate a handheld or backpack unit while leaving the trimmer or alternatively, the operator could change the trimmer to a convenient line blower. This method creates a clutter of units in the garage or on the landscaper's truck, which now this technology can accomplish with one unit combined with simple and easy line changes.

Uniquely and additionally, when using the line blower of the invention, the operator can also use the line fan to very efficiently edge. After edging, the same line fan blows the debris away with minimal dust creation compared to the conventional centrifugal method. When the line fan wears, it is removed and replaced.

There are many other non-landscaping applications for this flexible line fan technology which utilizes centrifugal force to position the flexible line blade while utilizing the unique living hinge, twist, and beam relationships as outlined in the prior patent applications and patent referenced above.

As briefly mentioned above, the unit 10 also may be utilized with a support (cart) so that it can perform precise edging or trimming functions, or function in the manner similar to that of a conventional walk behind lawnmower. FIGS. 8 through 11 show an exemplary support cart 35 for use with the unit 10 of FIG. 1, or for use with conventional string trimmers. The support cart 35 includes a bottom frame 36 (triangular in the embodiment illustrated in the drawings, but a wide variety of other configurations including circular or polygonal are possible), the frame 36 supported by at least three wheels, rollers, casters, or the like, such as the two large diameter rear wheels 37 and the smaller diameter front wheel 38, illustrated in the exemplary embodiment of the drawings. The wheels 37 are preferably rotatable about substantially the same axis, but not on the same axle, and the wheel 38 is steerable (that is the wheel or caster 38 is rotatable not only about an axis that is substantially horizontal as indicated by the shaft 40, but also rotatable about a substantially vertical axis 39); or the wheel 38 can be locked in a position so that the axis 40 thereof is perpendicular to the axis of rotation of the wheel 37.

Figure 8:
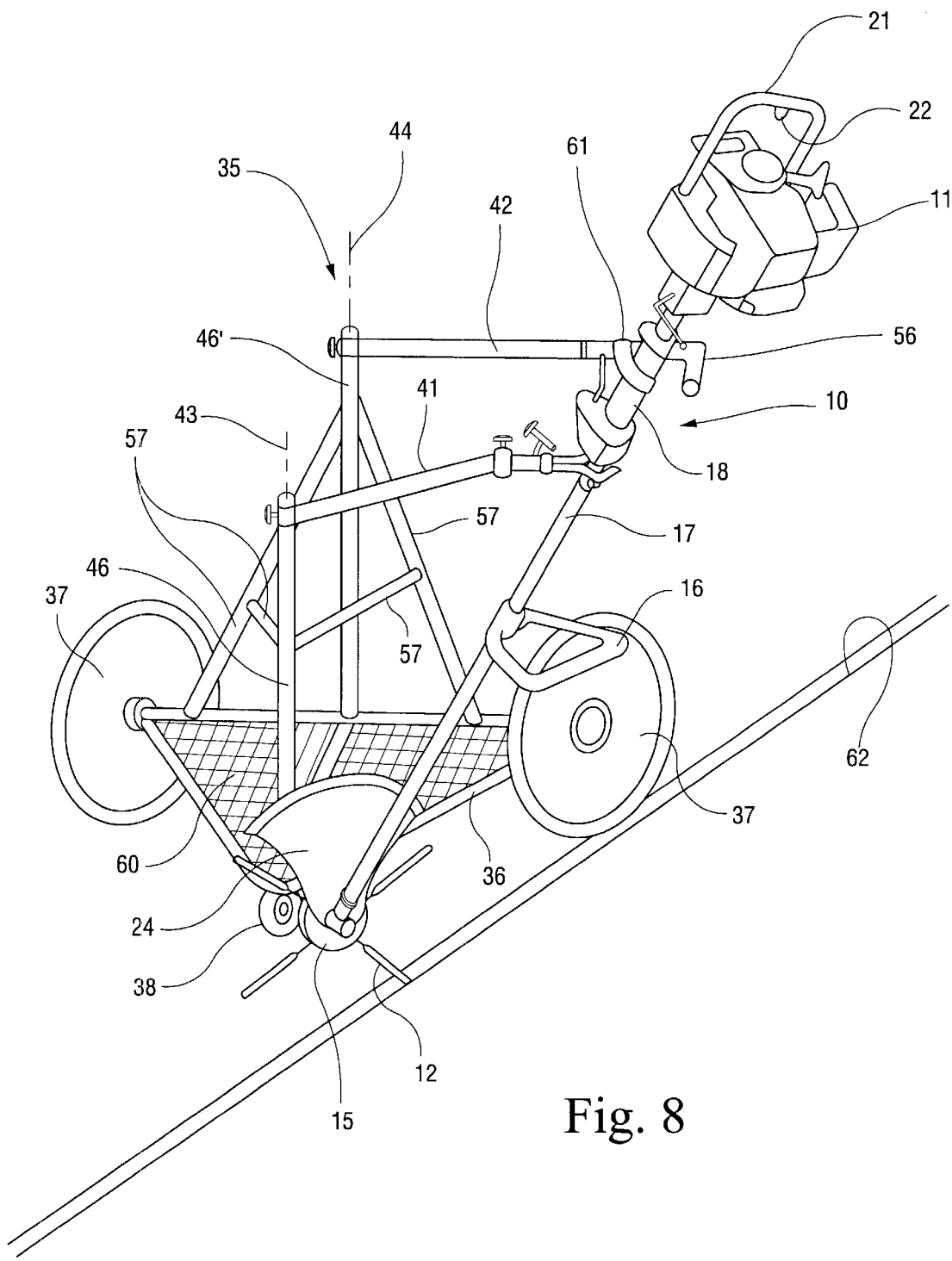
FIG. 8 is a perspective schematic view of a support cart according to the present invention which mounts the string trimmer according to the present invention, shown in the orientation for edging, with other orientations also being possible.
Figure 9:
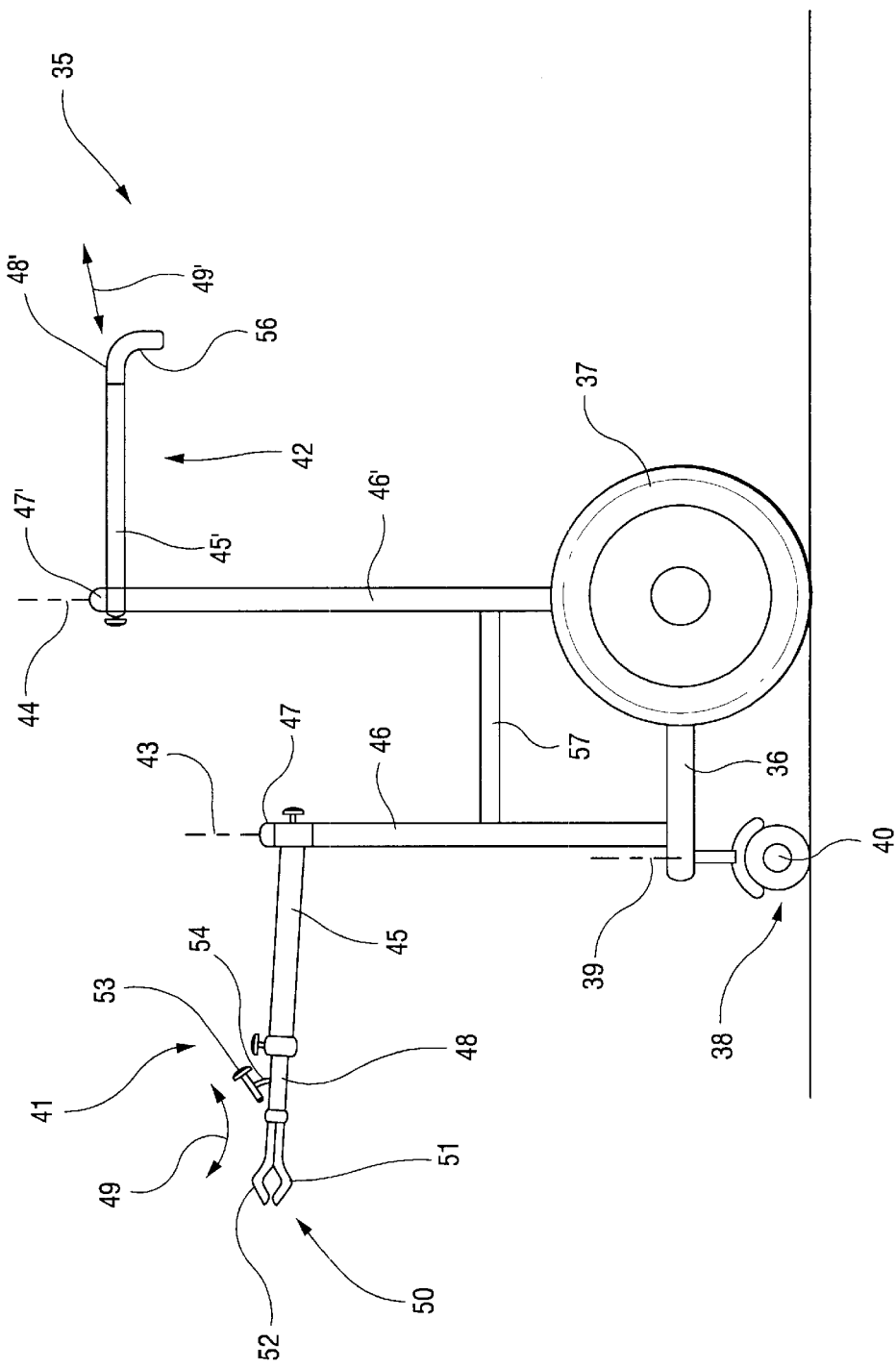
FIG. 9 is a side schematic elevational view of the support cart of FIG. 8.
Figure 10:
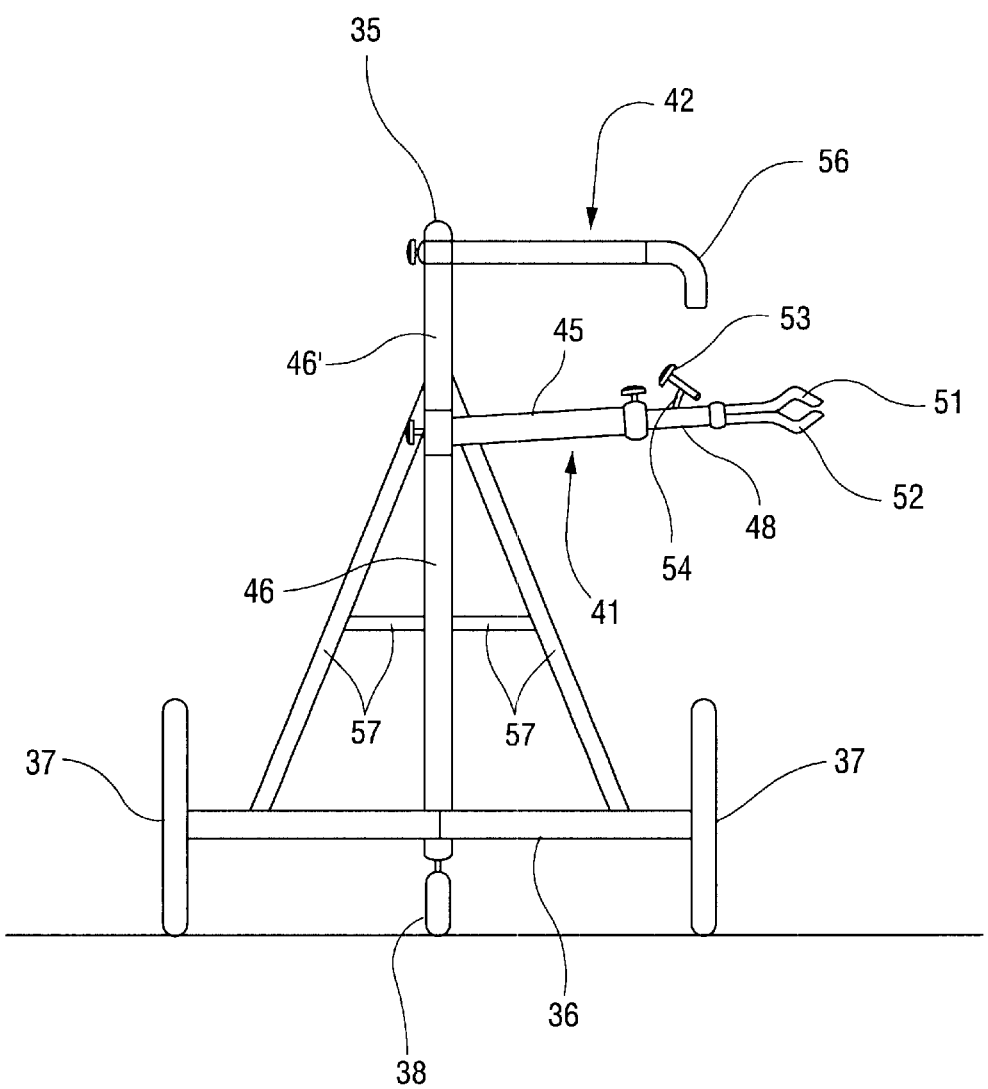
FIG. 10 is a front schematic elevational view of the support cart of FIG. 8.

The support cart 35 also includes two adjustable arms ultimately supported by the frame 36, the first arm shown schematically at 41 in FIGS. 8 through 11, and a second arm shown schematically at 42. Both of the arms 41, 42 are rotatable about substantially vertical axes, such as the axes 43, 44 seen in FIGS. 8 and 9. Both arms 41, 42 have telescopic portions. For example, the arm 41 has a larger diameter tube 45 connected to the substantially vertical support therefor with which the joint 47 establishing rotation about the axis 43 is provided, with a smaller diameter portion 48 slidable in the direction 49 (see FIG. 9) with respect to the portion 45. The arm 42 has a larger diameter portion 45', a smaller diameter portion 48' telescopic in the direction 49', a substantially vertical support 46'; and a joint 47', all again as illustrated in FIG. 9.

Mounted at the end of the arm portion 48 is a clamping mechanism 50. While a wide variety of different clamping mechanisms are illustrated, the embodiment show in the drawings (and most clearly seen in FIGS. 9 through 11) two clamp arms 51, 52 are provided one being movable with respect to the other by depressing the lever 53 against a spring bias provided by coil spring 54 or the like, the arms 51, 52 being configured (as illustrated) so that the shaft 17 may be received therebetween and clamped thereto by the bias provided by the spring 54.

The portion 48' of the arm 46', on the other hand, may merely comprise an angled portion 56 which provides a rest for the shaft 17, handle 18, or the like, as illustrated in FIG. 8, and with which an elastic band (as described hereafter) cooperates.

In order to secure the arms 41, 42 in a stable position with respect to the frame 36, a variety of different types of support rods or beams, which are shown merely in exemplary form collectively by the structures 57 in FIGS. 8 through 11, are provided extending between the supports 46, 46' and the frame 36, or extending between each other and the supports 46, 46', as illustrated.

Figure 11:
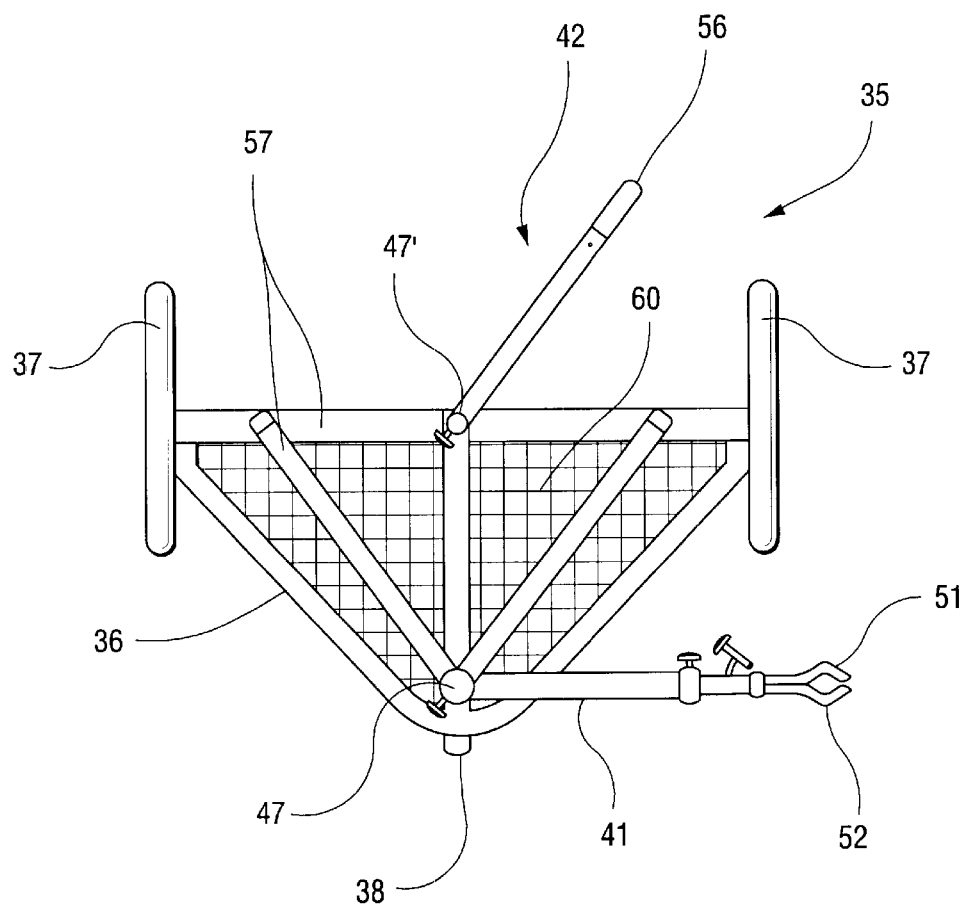
FIG. 11 is a top plan schematic view of the support cart of FIG. 8.

The support cart 35 also preferably comprises an accessories carrier, such as the plastic or wire mesh section 60 illustrated in FIGS. 8 and 11, which extends between the elements forming the frame 36 and allows any type of accessory equipment to be carried thereon without interfering with the unit 10. All of the components of the support cart 35 may be made out of metal and/or plastic, and solid plates may cover the mesh 60 when desired.

Thus, support cart 35 clamps and adjusts an operator supported line trimmer 10 to its frame 36 so as to be placed into a plurality of operating positions specifically associated with that of a rotary mower, edger, blower, or a trimmer in their individual operating modes. Its two adjustable arms 41, 42 are intended to locate the trimmer 10 in any such working position yet to allow quick disconnect for hand use. The front arm 41 articulates and clamps to any section of the trimmer shaft 17 while the rear arm 42 secures the trimmer by use of a conventional clamp or a flexible (e.g. rubber) band or shock cord, shown schematically at 61 in FIG. 8, while a portion of trimmer 10 rests on angled section 56. The band/cord 61 allows substantially 360° freedom of movement while still properly and adjustably positioning the unit 10.

The wheels 37, 38 are preferably independently mounted for individual movement and quick turning capabilities. The tray or mesh 60 is used to carry accessories and/or a large battery in the event a cordless electric trimmer 10 is used, to power the motor 11. Accessories include gasoline, hand tools, hand clippers, and line 12 accessories that might be necessary for the trimmer's operation, and general landscape maintenance.

The use of support unit 35 with a cordless trimmer 10 whose main weight is related to the size of the battery in order to achieve operating time without need for recharging is particularly advantageous. The cart 35 can easily carry a large battery (e.g. an auto 12 V battery, over twenty pounds) for the purpose of long life and ample power for larger cordless trimmers. The battery is connected to the trimmer with a coiled flexible electric cord that can reach about 15–20 feet from the cart 35. The operator will then move the cart 35 from one position to another and establish a working radius from the cart 35. The operator also has the option to remove the battery cord and operate the trimmer 10 on its own small 5–10 minute battery that is built into the trimmer itself (adjacent motor 11). The trimmer 10 can also be wired to receive its charge from the large battery source. Essentially the cart 35 offers the user a lightweight powerful corded trimmer with the cordless option of independent operator control and use. This greatly expands a range of the electric trimmer without the need to hook up to the house power via long extension cords. It also substantially reduces the risk of electric shock through the ground or wet outside surfaces which is a common problem with AC power tools used with long extension cords. The large battery (e.g. 12 V auto) can be charged overnight in the garage or off a truck charging system. Therefore the cart 35 offers an optional DC corded or cordless trimmer with extended versatility and duration of operation. This allows a very useful device that would be quiet and free of gasoline usage and would fit both professional and homeowner markets.

The cart 35 is preferably constructed from metallic or plastic tubing, preferably consisting essentially of plastic to electrically insulate it from the ground. That is, all of 36, 46 46', 45, 45', 48, 48', and 57 may be plastic tubes.

The engine or cordless trimmer when attached to the cart 35 also contains a convenient trimmer control 22 at the fingertip of the operator. This allows the operator to "walk behind" the unit with fingertip control. When the finger is released the trimmer 10 comes to a stop, i.e. when the operator releases the trigger 22 the trimmers' motor or engine 11 returns to idle or comes to a stop. The unit's trigger is equipped with a spring loaded device to close when released.

Thus, the cart 35 reduces the overall work effort required by the operator while at the same time offers independent operator control of the trimmer in combination with the aerodynamic cutting line 12, 12', 12". The trimmer 10, because of the aerodynamic cutting line 12, 12', 12", has greater versatility in edging, sweeping, as well as trimming. The ability to hold the trimmer 10 into a fixed horizontal position now incorporates the basic features of a walk behind mower for smaller lawns. This allows the use of one machine to do all the necessary jobs without having to have independent devices such as a walk behind mower, edger, trimmer, and a blower. A combination of all of these devices nicely fits the need and also utilizes the concept of the support cart as an additional feature which reduces work and makes the entire operation more convenient and universal.

Figure 6:
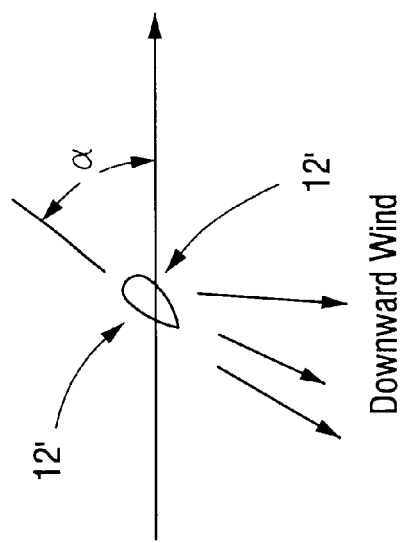
FIG. 6 is a detail schematic view showing the pitch of the aerodynamic line of the blower/sweeper of FIGS. 4 and 5.

The tip speed of the line 12, 12', 12" during operation of the unit 10 and cart 35 like a "walk behind" mower is preferably on the order of 29,000 feet per minute, and where four lines are provided it has twice as many hits as a conventional rotary blade of a conventional rotary lawnmower (which generally operates at a tip speed of about 17,000 feet per minute). The unit 10 with the line 12" pitch angle as seen in FIG. 6 will lift the grass up before cutting just like a conventional walk behind mower if properly positioned by the operator. FIG. 8 shows the unit 10 being used for trimming along the sidewalk edge 62, the orientation would be different from that illustrated in FIG. 8 if used as a walk behind mower.

Instead of the cart of FIGS. 8–11, the trimmer 10 may be used with conventional walk behind platforms, such as the "WEED WALKER" sold by WeedCo of Moore, Okla.

Another aspect of the invention is to provide increased inertia for the trimmer head so as to more effectively cut heavy grass or like vegetation with cutting line.

Round string on a line trimmer is limited in its ability to cut heavier grass because of its own naturally weak beam. Larger line gas trimmers have added power and the ability to rotate the round line up to high speeds so as to increase centrifugal force to establish a better cutting beam. Hypothetically, assuming a counter-clockwise rotating cutting head, one observes a difference in cutting while moving the shaft from right to left versus moving the shaft from left to right. Generally under these conditions, the heavier load is placed onto the string when cutting from left to right. While using a round string, the engine begins to drop in speed when excessively loaded, but takes a reasonable time to do so. Thus, the round line under these conditions, because of its limited beam capability, will fold back, thus creating a relief or a torque limit applied against the power source.

Under similar conditions, an "aerodynamic" cutting line" (FIGS. 1–3), which is one as shown in copending application Ser. No. 09/243,786, and as seen at 12, 121 in FIGS. 5 and 6, which has a natural and substantially stiffer beam section (and preferably with a twist), causes the engine to rapidly decelerate to the slip point of the clutch. This is observed when cutting from left to right, more specifically cutting in the front right quadrant when facing from the operator position. Its overloaded condition results from the strong "aerodynamic" beam being forced against a very strong resistance of grass. Unlike the weak round line, the strong "aerodynamic" beam will hold up to this resistance and will transfer the torque load back to the engine. The engine does not have the output torque to carry the line through this cut. The cut that is to occur is of very short duration in the area or zone of the front right quadrant. This particularly occurred while using a 15 inch cutting swath diameter −0.100"×0.300" aerodynamic line on an Echo SRM 2101. It also occurred on a Shindaiwa T20. The time for this cut to occur in the front right quadrant is approximately 2.9 milliseconds (0.0029 seconds) and would vary, depending on the rpm. In this case, the engine speed was 7200 rpm while the head speed was reduced by a geared 1.4 ratio to about 5100 rpm.

When using the same designed heads (geometry and inertia), time cutting test results in 400 sq. ft. of heavy grass indicated the following while using an Echo SRM 2101:

| 0.95" round | .100"×.300" "aerodynamic" |
|---|---|
| 9 minutes, 15 sec. | 11 minutes, 35 sec. |

Note initially there was approximately a 22% slower cutting rate with the aerodynamic line 0.100"×0.300" compared to the 0.095" round line as the aerodynamic line bogged down the engine, requiring wasted time to accelerate the engine back up to speed. This heavy load caused an engine collapse.

Why such a negative result occurred was studied and it was determined there was a need for added momentum or a flywheel effect to eliminate this collapse.

Adding inertia or mass to the outside diameter of the head to an inertia deficient unit creates the difference needed when cutting heavy grass such as experienced. As a result of adding approximately 2.5 oz. of lead at a radius of approximately 2", the cutting of 400 sq. ft. of grass was completed in 6.5 minutes using the same 100"×0.300" aerodynamic line. Now the difference represents a favorable 30% reduction compared to the 0.095" round or a total swing of approximately 50% compared to the 0.100"×0.300" aerodynamic line which initially ran with an inertia deficient system.

On an inertia deficient system, one can visually see, cutting from left to right causes the line to dig in which rapidly overcomes or collapses the engine. This does not occur with round line because round line naturally and easily folds back, does not add excessive load to the engine and allows the engine to continue at its elevated speed. The round line is not creating as much resistance to the grass and therefore does not load the engine while the strong beam aerodynamic line holds up to the resistance and rapidly loads the engine.

Added inertia allows energy to be stored and then to be released within the short period of time of this cutting event as the aerodynamic line cutter continues to go through without interruption due to the release of energy stored within the rotating parts. Since there is no engine collapse, a major time benefit occurs as the operator does not have to spend the time for the unit to accelerate back to speed. This was the cause of the initial poor aerodynamic heavy line cutting performance. The aerodynamic line now is able to efficiently slice through heavy grass where round line folds back.

Adding aerodynamic cutting line beam stiffness increases the instantaneous torque required during the short time of the cut where weaker line folds back to allow a torque release. Round line doesn't need the stored inertial energy. Its weak beam cannot deliver the strength needed to cut heavy material.

The added inertia converts the stored potential energy to an instantaneous torque provided by the power source. The instantaneous torque is dependent upon beam strength, the work resistance, time of the cut, and the available kinetic energy within the total system. If available kinetic energy is deficient or interrupted by other release mechanisms such as a clutch or a flex cable, etc., the system will collapse. Therefore, proper kinetic energy is required at the head where the cutting occurs since the engine is separated from the cutting head by a clutch, cable and a gear mechanism. Further, an excess of inertia will require energy to raise its speed which would be wasteful and unproductive.

It was initially quite surprising to experience the poor performance of the aerodynamic line, but proved an inertia deficient system to be the cause. The living hinge of the aerodynamic line was expected to deflect back and at least give an equal or slightly better cutting time. However, because the cutting time and the instantaneous torque response are so rapid, the hinge with this combination does not have time to work or to deflect as intended in such a situation. As an example, a 0.130"×0.400" line set was a 24" cutting swath on an Echo SRM 2601. While running at its full throttle position at about 6,000 rpm the engine collapsed rapidly when the string contacted grass on the front right quadrant. After adding approximately 7.1 oz. of weight to the head at a 2" radius and performing the same test, the collapse did not occur, and the hinge had a chance to work and deflect.

Adding adequate inertia increases the carry through and prevents the collapse. It then allows the control or living hinge to work. The living hinge is designed to fold back, which takes time. When there is sufficient time to fold, the pre-designed hinge will release to fold back at its intended design flex.

While this principle applies to gas engines as well as battery powered units, the collapsed time is more so affected on a two cycle engine compared to a DC motor because of cyclic variations of the 2 cycle engine, and different type torque curves of the DC motor versus the 2 cycle engine.

Therefore, it is apparent that the total system inertia comes into effect, i.e., the kinetic energy of the combined rotating parts. However, the specific inertia should be added directly to the head that carries the line because there may be interruptive factors that could change the timing of the cut when the inertia and its resulting kinetic energy would be required.

Adding inertia expands the small time pulse window of an inertially deficient system. Another way to say it is, it reduces the deceleration rate that causes engine collapse. Therefore, the positive characteristic of release that comes with the weak 0.095" round line can be duplicated on a strong aerodynamic line by adding a certain amount of inertia which increases the kinetic energy of the rotating parts applied at the head that carries the string.

The same principle can be applied to the added resistance when more than two lines are employed. Therefore, as an example, a four line may create an inertia deficient system that was adequate for a two line system. The general formulas used to verify this technology are as follows:

Head Inertia Considerations

| Equation: | Conservation of Energy |
|---|---|
| $KE_1 +$ | $U_{1 \to 2} = KE_2$ |
| $KE_1 =$ | $\frac{1}{2}(I_{eng})(\omega_1)^2 + \frac{1}{2}(I_{head})(\omega_1)^2$ |
| $U_{1 \to 2} =$ | $M\theta$ |
| $KE_2 =$ | $\frac{1}{2}(I_{eng})(\omega_2)^2 + \frac{1}{2}(I_{head})(\omega_2)^2$ |

Where, $I_{eng}$=Total Inertia of Engine (Flywheel, Crank Shaft, Bearings, etc.)

$I_{head}$=Total inertia of String Head $\omega$=angular velocity of head and engine M=Torque or Moment created by cutting Grass $\theta$=Total in cutting swath (in radians) where grass is being cut (maximum of 90 degrees or $\pi/2$)

Substitution of parts, $$\tfrac{1}{2}(I_{eng})(\omega_1)^2+\tfrac{1}{2}(I_{head})(\omega_1)^2+M\theta=\tfrac{1}{2}(I_{eng})(\omega_2)^2+\tfrac{1}{2}(I_{head})(\omega_2)^2$$

Solve for $I_{head}$, $$M\theta=\tfrac{1}{2}(I_{eng})(\omega_2^2-\omega_1^2)+\tfrac{1}{2}(I_{head})(\omega_2^2-\omega_1^2)$$

$$(2M\theta)/(\omega_2^2-\omega_1^2)=I_{eng}+I_{head}$$

$$I_{head}=(2M\theta)/(\omega_2^2-\omega_1^2)-I_{eng}$$

The purpose of this equation is to find the optimum value for the head Inertia.

Figure 12:
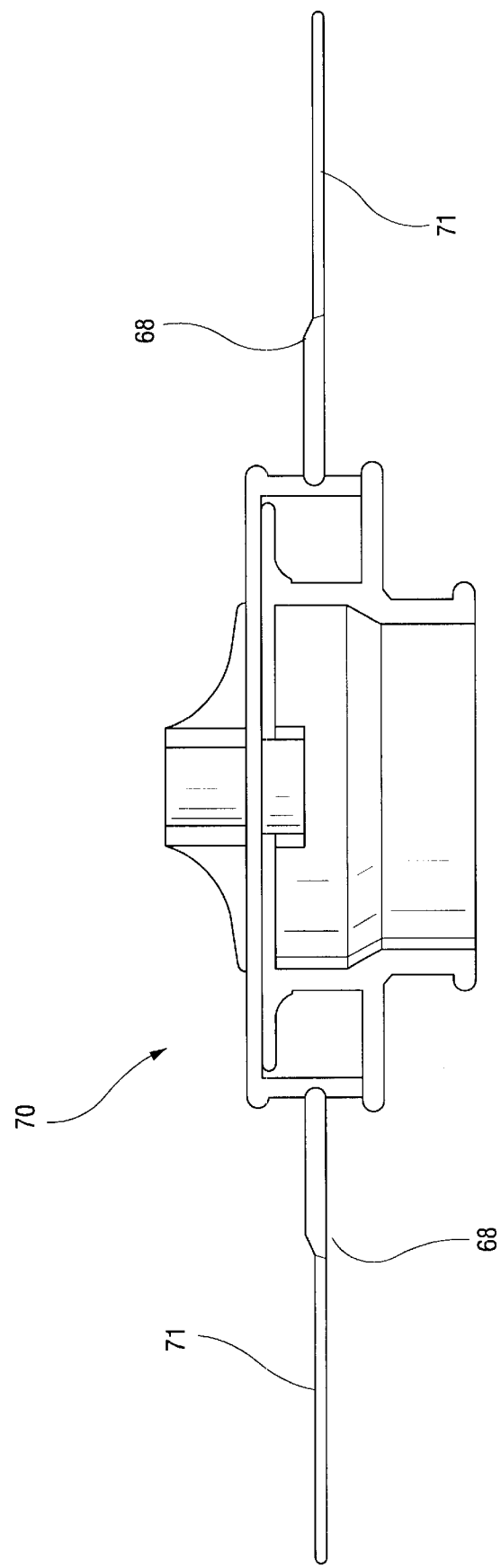
FIG. 12 is a side view, partially in cross section and partly in elevation, of a head having aerodynamic line.

FIG. 12 shows a standard string trimmer head 70 with an aerodynamic line 71 having a living hinge 68 (almost any number of the lines 71 may be mounted). The weight range of head 20 is 7–10 oz. with lightweight nylon string. The polar moment of inertia is measured at 1.2–1.5 inch-pound sec.$^2$.

Figure 13:
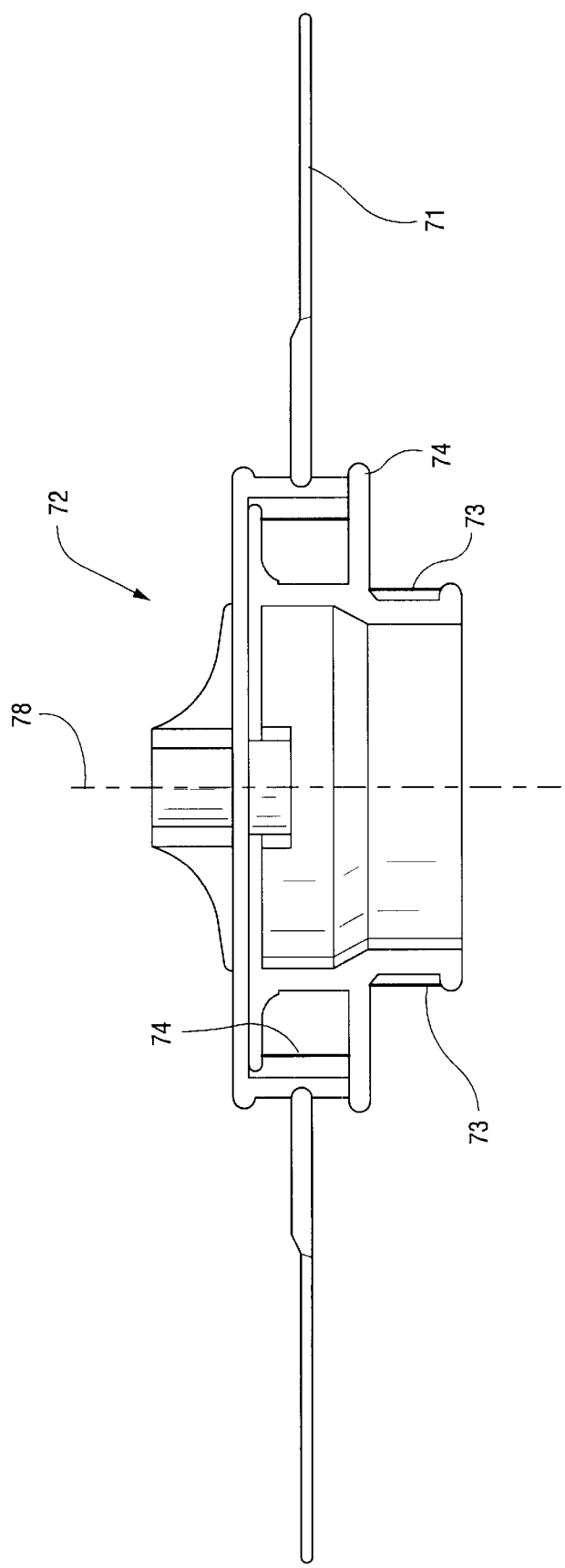
FIG. 13 is a view like that of FIG. 12 only showing the head according to the invention in which additional inertia is provided for the head by the addition of lead weight tape.

An enhanced inertia system head according to the invention is seen at 72 in FIG. 13. It has the same basic construction as the head 70, including a body 69 of relatively rigid material (e.g. metal or rigid plastic) except that in this case lead weights, in the form of lead (or other heavy material) weight tape, indicated at both 73 and 74, has been added to portions of the head 72 spaced from the axis of rotation 75. For example, the lead weight 73 is spaced about 1½ inches from the axis 75 while the lead weight tape 74 is spaced about 2½ inches (both distances radial). It is desirable to add between about 1½ and 14 ounces (or any narrower range within this broad range) to the head 72, compared to the head 71, to give a total weight of between about 8.5–24 ounces. The polar moment of inertia is then increased from 1.3+/−0.2 inch-lb. sec. squared to a range of about 1.6 to 2.4 in. lb. sec. squared. Thus, on the same ½ to 1½ inch horsepower string trimmer unit (for powering the head 72 about the axis 75) with aerodynamic cutting line, the head 72 performs without deceleration, and increasing cutting rate drastically as compared to round conventional line. Also, the added weight provides mass inertia and torque to allow additional lines 69 to be used (any number between one and a dozen, for example), and lower cutting speeds while still effectively cutting.

While lead weight tape 73, 74 is illustrated in FIG. 13, it is to be understood that any suitable conventional manner of adding weight to a rotating body 69 may be utilized. For new constructions it is also possible to mold or otherwise form the head 72 body 69 with the weights right in it and/or to cast the head 72 body 69 out of a heavier material such as aluminum with thickened portions, zinc, or metal alloy, all so as to increase the inertia of the head so as to effectively cut even heavy vegetation. That is, a polar moment of inertia, for a ½ to 1½ horsepower string trimmer, is preferably between about 1.6 to 2.4 lbs. sec. squared (or any narrower range within this broad range).

Figure 14:
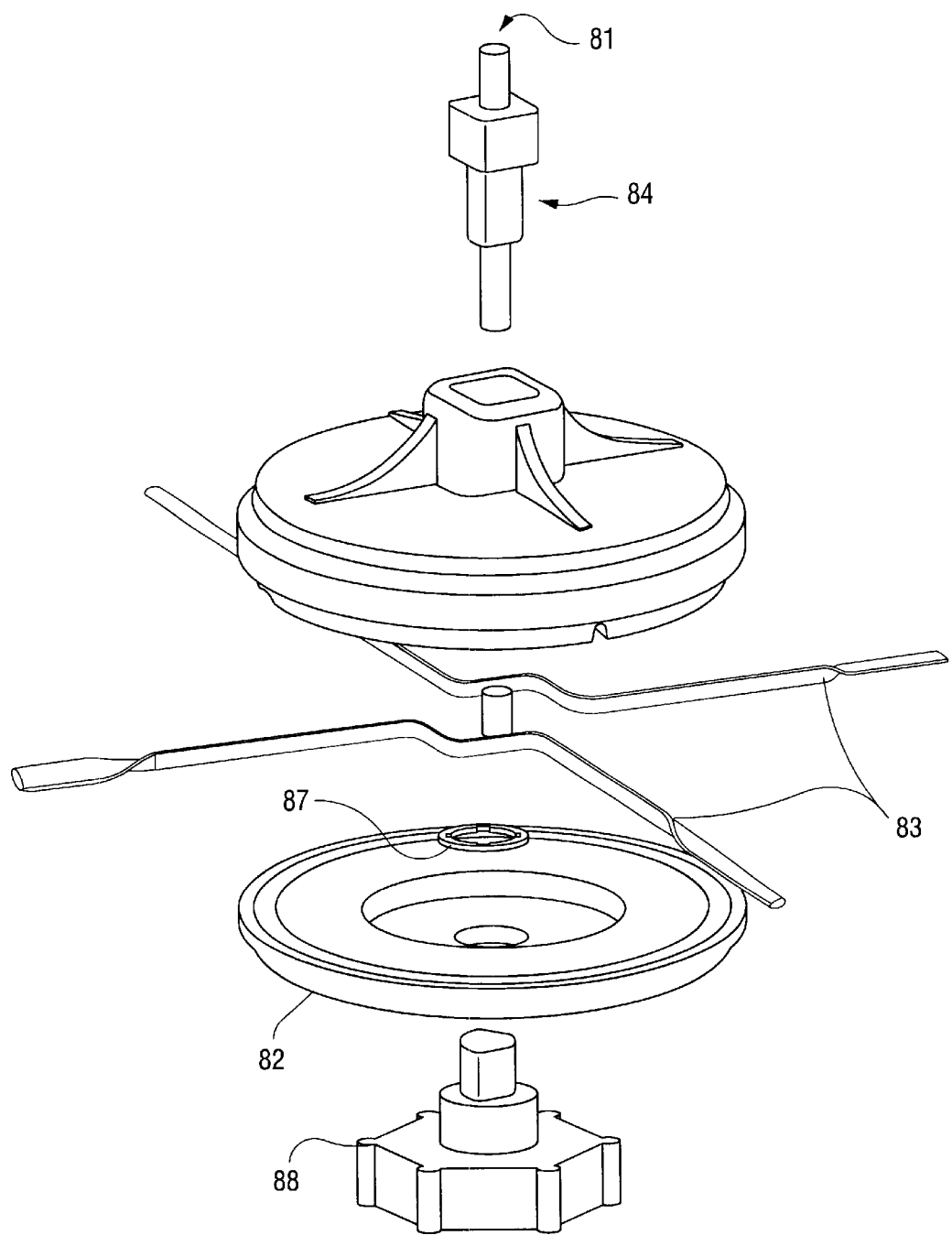
FIG. 14 is an exploded perspective view of another form of a head of a string trimmer according to the invention which has enhanced inertia.

FIG. 14 illustrates large inertia elements for a string trimmer head assembly. In this embodiment a cutting element retaining head 80 having a large inertia (mass and location of mass with respect to the axis of rotation 81) cooperates with a large inertia cutting element retaining cap 82. Both the elements 80, 82 are either made of an increased density material compared to conventional trimmer heads and/or have the weight distributed further from the axis of rotation 81. The aerodynamic cutting elements 83 are sandwiched between the elements 80, 82 and held in place utilizing the fastening elements 84, 85, which can be screw threaded into engagement with each other or snap-fit together. A spacer 86 and O-ring 87 also may be provided.

Figure 15:
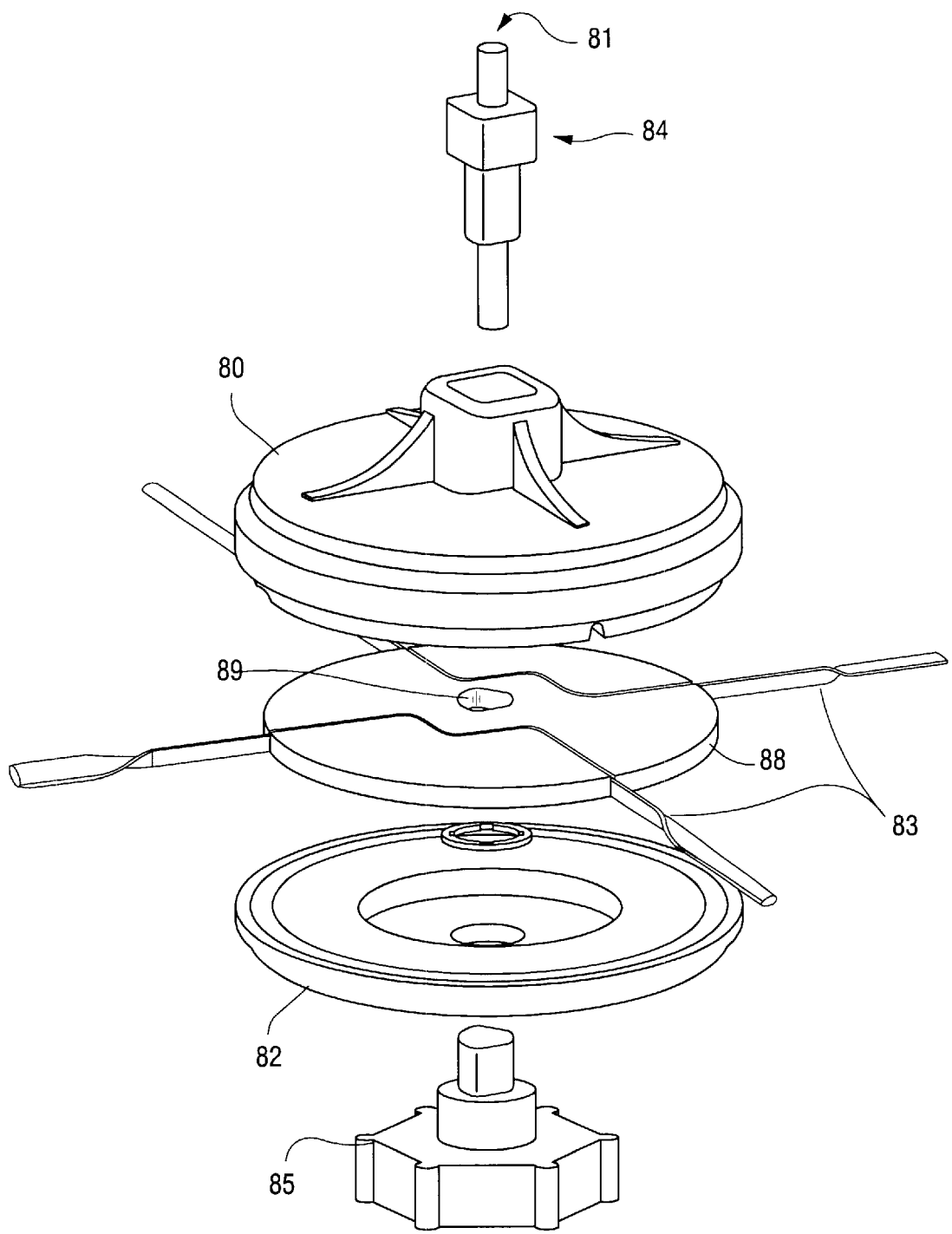
FIG. 15 is a view like that of FIG. 14 only with a modified structure for positively maintaining the aerodynamic cutting elements in place.

FIG. 15 illustrates a construction, with or without increased inertia, like that in FIG. 14, and components comparable to each other as shown by the same reference numeral. However, FIG. 15 also illustrates a mechanism 88 that holds the aerodynamic cutting element 83 in a particular relationship.

In FIG. 15 the round retaining head 80 and retaining cap 82 have a preloaded and/or reloadable line cartridge 88 to accept pre-cuts lengths of varying center holding configurations. The head 80 is attached to the rotating portion of the flexible line trimmer while the cap 82 retains the line cartridge 88. The line cartridge 88 is assembled into the head with a "fit" or "no fit" center arrangement, such as, for example, by a "go" or "no go" tapered male/female shape such as a modified hex, spline, other irregular geometric shapes, etc., a modified hex being illustrated at 89 in the embodiment of FIG. 15. The "fit/no fit" approach assures proper orientation of the line 83 to correctly match the line trimmer rotational direction about the axis 81.

Color differentiation of the lines 83 may also be provided to enhance their intended functions, and will help identify different fineness of cut; for example a fine cut (green), aggressive cut (red), heavy grass and weed cut (purple), heavier weed and brush cut (black), and combination edging line and fan or blower line (blue), all of different colors (exemplary colors indicated in parenthesis). Cartridges 88 can also be colored matched to the line 83 color to also differentiate orientation, direction of cut, and line function.

According to the present invention it is also possible to—for gas powered engines associated with the trimmers—to meet air pollution requirements but yet reduce abrasion and thrown object frequency, and increase torque, compared to conventional constructions. In conventional gas engine trimmers, the ratio of the engine speed to the output of the head is typically less than 1.4, e.g. 1.0–1.4. That is, it is desirable to have the output of the head close to the output of the engine. However, that results in increased abrasion of the line when the engine is operated at a high enough speed to meet air pollution criteria, and can result in objects being thrown with a frequency and energy that is less desirable, and the torque actually transmitted to the "line blade" (cutting line) may be less effective. However, utilizing the aerodynamic line (e.g. 12, 12', 71, 83) according to the invention it is desirable to provide a ratio of engine speed to output speed of the head of greater than 1.4, e.g. typically in the range of about 1.6–1.9, but even up to 2.0 or more. For example, if the engine speed is 10,000 rpm (the speed of the output shaft of the gas powered engine likely meeting air pollution requirements), according to the present invention the speed of the rotating head should be about 7100 rpm or less.

For battery powered units, none are known out on the market that gear down from the output of the electric motor to the output of the head. According to the invention, however, it would be desirable to gear down even battery powered trimmers. A desirable output speed of the head of a battery powered trimmer pursuant to the invention would be about 4500–5000 rpm. A desired ratio of engine speed to the output speed of the head according to the invention, for battery powered trimmers, is greater than 1.4, e.g. 1.4–about 1.8.

In all the above disclosures, all narrower ranges within a broad range are also specifically provided herein. For example (only) a moment of inertia between 1.6 and 2.4 means 1.7–2.1, 1.8–2.4, 1.8–2.25, and all other narrower ranges within the broad range, and an angle of between 5–30° downward means 6–29°, 6–10°, 10–28°, etc.

It will thus be seen that according to the present invention a string trimmer with enhanced functionality is provided, having optimum operation when used for cutting vegetation, and also utilizable as a blower/sweeper, for mowing, for edging, etc. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, devices, and methods.

What is claimed is:

1. A string trimmer comprising:
    an engine or motor;
    a head operatively connected to said engine or motor;
    an aerodynamic line connected to said head and having a long beam axis having a pitch angle;
    a shaft extending between said engine or motor and said head; and
    means for changing said pitch angle of said aerodynamic line from a first pitch angle which is between about 0–10°, and a second pitch angle which is between about 15–45° upward, and a third pitch angle which is between about 5–30° downward.

2. A string trimmer as recited in claim 1 wherein said head comprises an air scroll and debris shield.

3. A string trimmer as recited in claim 1, further comprising a gear box with at least two different gearings operatively connected between said engine or motor and said head for changing a gear ratio depending upon said pitch angle.

4. A string trimmer as recited in claim 3 wherein said engine or motor and gear box are constructed so that for a first gear box gearing said head has a rotational speed of between 2500–6000 rpm, and for a second gearing said head has a rotational speed of over 6000 rpm.

5. A string trimmer as recited in claim 3 wherein said head, aerodynamic line, engine or motor, and gear box are constructed so that said gear box has a first gear which provides a head rotational speed of between 3000–5000 rpm comparable to a 15–17 inch swath width, and said gear box has a second gear ratio so as to provide a head speed of between about 6100–9000 rpm comparable to a 15–17 inch swath width.

6. A string trimmer as recited in claim 3 wherein (a) said engine or motor comprises a gasoline engine and wherein said gear box has a first gear ratio so that the ratio of the engine speed to said head speed is about 1.4 or more; or (b) said engine or motor comprises a battery powered motor, and wherein said gear box has a first gear ratio so that the ratio of engine output speed to head speed is greater than 1.0.

7. A string trimmer as recited in claim 1 further comprising a handle mounted on said shaft, a first detented trigger having at least three operational positions mounted on said shaft for controlling the energy supply to said engine or motor, a second handle mounted on said engine or motor on the opposite portion thereof from said head, and a second detented trigger mounted on said second handle for alternatively controlling the energy supply to said engine or rotor.

8. A string trimmer as recited in claim 7 mounted on a cart having at least three wheels and first and second adjustable arms mounting said shaft or engine or motor thereto so that said string trimmer is operational by utilizing said second trigger when mounted to said cart.

9. A string trimmer as recited in claim 1 wherein said means for adjusting the pitch angle comprises distinct first, second and third cartridges mountable to said head, said first cartridge mounting said aerodynamic line so that it has a predetermined pitch angle between about 0–10°, said second cartridge positively mounting said aerodynamic line so that it has a pitch angle between about 15–45° upward, and said third cartridge positively mounting said aerodynamic line so that it has a pitch angle between about 5–30° downward, said first, second and third cartridges being alternatively mounted to said head.

10. A string trimmer as recited in claim 9 wherein said first head has a polar moment of inertia of between about 1.6–2.4 inch pounds second squared.

11. A string trimmer as recited in claim 1 mounted on a support cart comprising a bottom frame assembly mounting at least three wheels, each wheel rotatable about a substantially horizontal axis;
    first and second adjustable length arms, each arm mounted for rotation about a substantially vertical axis, and each arm having a free end;
    a clamp at said free end of said first arm for clamping a shaft of said string trimmer thereto; and
    a clamp, a flexible band, or flexible cord mounted at said free end of said second arm for operative attachment to said string trimmer so as to mount said string trimmer, with said clamp at said first arm free end, so as to facilitate utilization thereof for vegetation cutting.

12. A method of operating a string trimmer having an engine or motor which is operatively connected to a head, the head mounting aerodynamic line having a long beam axis having a pitch angle, said method comprising:
    (a) operating the engine and the head in a first mode of operation where the pitch angle of the aerodynamic line is between about 0–10° and the string trimmer is used for vegetation cutting; and
    (b) changing the pitch angle of the aerodynamic line and operating the string trimmer in a second mode where the pitch angle is between about 15–45° upward and the string trimmer is used as a blower to provide a downward flow of air which clears cut vegetation in the surrounding area.

13. A method as recited in claim 12 further comprising (c) changing the pitch angle of the aerodynamic line and operating the string trimmer in a third mode where the pitch angle is between about 5–30° downward to create an updraft.

14. A method as recited in claim 13 wherein (a) is practiced by rotating the head at a rotational velocity of between about 2500–6000 rpm, wherein (b) is practiced by rotating the head at a rotational velocity of over 6000 rpm, and wherein (c) is practiced by rotating the head at a rotational velocity of between about 3000–5000 rpm.

15. A head for a string trimmer comprising:

a body of rigid material;

an aerodynamic line connected to said body and having a long beam axis having a pitch angle and a twist with a living hinge, said head having a polar moment of inertia when used as a string trimmer head of between about 1.6–2.4 inch pounds second squared; and means for changing said pitch angle of said aerodynamic line from a first pitch angle which is between about 0–10°, and a second pitch angle which is between about 15–45° upward, and a third pitch angle which is between about 5–30° downward.

16. A trimmer head as recited in claim 15 operatively connected to a gasoline powered engine through gearing, said gearing providing a ratio of engine speed to the output speed of said head of about 1.5 or less.

17. A trimmer head as recited in claim 15 operatively connected to a battery powered motor, and gearing, and wherein said gearing connects said battery powered motor to said head so that a ratio of motor speed to speed or rotation of said head is greater than 1.4.

18. A trimmer head as recited in claim 15 operative connected to an engine having a flywheel, crankshaft, bearings, and other inertia elements, and wherein the polar moment of inertia of said head is approximately determined by the equation $$I_{head}=(2M\theta)/(\omega_2^2-\omega_1^2)-I_{eng},$$

wherein $I_{eng}$=Total Inertia of Engine (Flywheel, Crank Shaft, Bearings, etc.), $I_{head}$=Total inertia of String Head, $\omega$=angular velocity of head and engine, M=Torque or Moment created by cutting Grass, and $\theta$=Total in cutting swath (in radians) where grass is being cut (maximum of 90 degrees or $\pi/2$).

19. A trimmer head as recited in claim 15 further comprising dense weights mounted to or molded within said body spaced from the axis of rotation of said head, and wherein said head has a total weight of between about 8.4–24 ounces.

* * * * *